No. 881,331. PATENTED MAR. 10, 1908.
J. L. NIX.
INCUBATOR.
APPLICATION FILED JULY 24, 1906.

Witnesses
L. A. L. McIntyre
E. Patton

Inventor
James L. Nix
by Hopkins & Ericks Attys

UNITED STATES PATENT OFFICE.

JAMES L. NIX, OF HOMER CITY, PENNSYLVANIA.

INCUBATOR.

No. 881,331.　　　　　Specification of Letters Patent.　　.Patented March 10, 1908.

Application filed July 24, 1906. Serial No. 327,586.

*To all whom it may concern:*

Be it known that I, JAMES L. NIX, a citizen of United States, and resident of Homer City, Pennsylvania, have invented certain new and useful Improvements in Incubators, of which the following is a specification.

My invention relates to improvements in incubators, and has for its object to provide means for equalizing the distribution of heated air in the egg chamber of an incubator.

Figure 1:
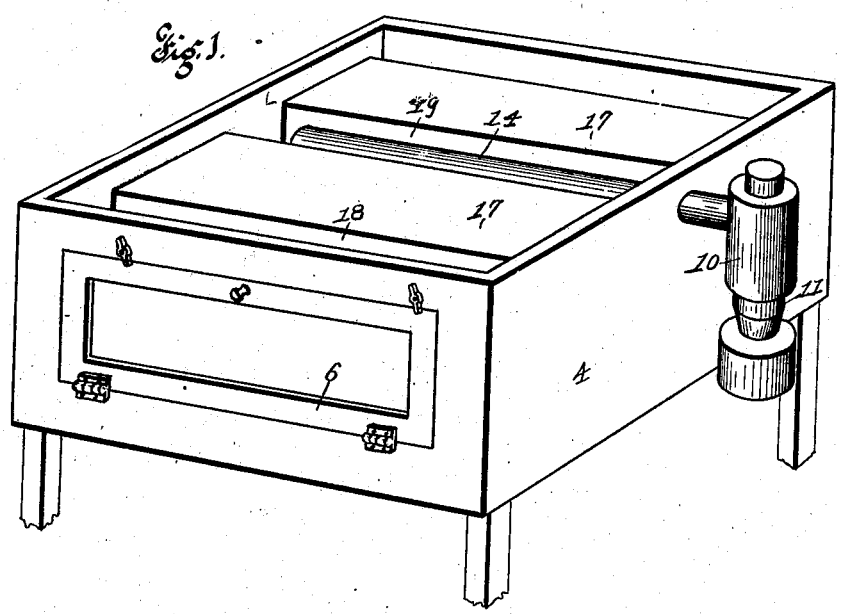
Figure 2:
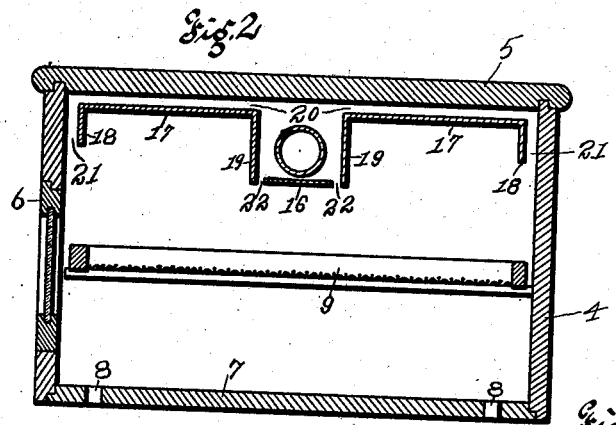
Figure 3:
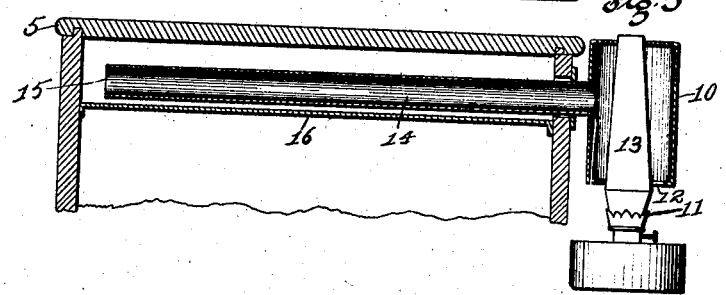

In the drawings: Figure 1 is a perspective view of an incubator embodying my invention, the top of the incubator casing being removed. Fig. 2 is a transverse, vertical view in midsection of the same. Fig. 3 is a longitudinal, vertical view in midsection of the heating drum, and heat distributing pipe embodied in the form of my invention which is illustrated by Figs. 1 and 2.

I have illustrated herewith a simple embodiment of my invention, comprising a casing 4 provided with a top 5, and door 6.

The bottom of the incubator casing, indicated by the numeral 7 is provided with the openings 8, an egg tray 9 is mounted within the casing 4. The heating drum 10 is heated by means of a lamp 11, the drum 10 being open at its bottom as indicated by the numeral 12 to admit a constantly ascending column of fresh air to be heated by contact with the lamp chimney 13.

A horizontal heat distributing pipe 14 extends from the heating drum 10 through one of the side walls of the casing 4 and across the top of the incubator; the inner end 15 of the pipe 14 being open. Beneath the pipe 14 I have provided a horizontal deflecting strip 16 extending entirely across the width of the interior of the incubator casing 4 as shown in section by Fig. 3, the purpose of the strip 16 being to prevent excessive heating of that portion of the egg tray 9 which is directly beneath the pipe 14.

Near the top 5 I have provided two deflectors 17, extending entirely across the width of the interior of the incubator, and provided with the depending vertical walls 18 and 19, the walls 19 being projected downwardly until they approach the outer edges of the sheet or strip 16 in the manner indicated in section by Fig. 2.

The mode of operation of the above described form of my invention is as follows: A continuous supply of heated fresh air is formed in the heating drum and passes into the incubator through the pipe 14, out of its open end 15. The heated air thus admitted to the egg chamber rises, and is distributed laterally through the passages 20 to or near the opposite walls of the incubator, when it passes downwardly through the passages 21, to the interior of the egg chamber. Having become partly cooled during this process the same air rises through the passages 22 between the walls 19 and edges of the strip 16. In this manner I secure a constant and equable distribution of the heated air.

Having thus described my invention, what I claim is:

1. An incubator having an egg chamber, an egg tray mounted in the egg chamber, a suitable source of heat supply, a horizontal air-distributing pipe mounted within the egg chamber, a horizontal deflector mounted beneath said pipe, and vertical deflectors mounted at the sides of said pipe, substantially as described.

2. In a device of the class described a combination of an incubator having an egg chamber, a heating drum, a pipe connecting the heating drum to the end of the egg chamber, a horizontal deflector mounted beneath said pipe deflectors mounted in the upper portion of the egg chamber and vertical deflectors mounted at each side of the first named deflector, substantially as described.

3. An incubator, having an egg chamber, an egg tray mounted in the egg chamber, deflectors mounted in the upper portion of the egg chamber forming a passage between the same and the top of the incubator, a pair of depending walls projecting downwardly and located centrally in the egg chamber, a distributing pipe located in the egg chamber between the centrally depending walls, a horizontal deflecting strip located beneath the distributing pipe and extending throughout the length of the egg chamber, downwardly projecting deflecting walls 18 formed on the ends of the horizontal deflectors forming passages at the sides of the egg chamber between the same and the vertical walls of the incubator, substantially as specified.

In testimony whereof, I have signed my name to this specification, in presence of two subscribing witnesses.

JAMES L. NIX.

Witnesses:
　C. F. JAMISON,
　HARRY A. MCALEE.